Dec. 5, 1939.    H. MJOLSNESS    2,182,638

APPARATUS FOR SEPARATING GRAIN

Filed Feb. 4, 1935    4 Sheets-Sheet 1

Inventor

Haakon Mjolsness

By Howard Fischer

Attorney

Dec. 5, 1939. H. MJOLSNESS 2,182,638
APPARATUS FOR SEPARATING GRAIN
Filed Feb. 4, 1935 4 Sheets-Sheet 2

Inventor
Haakon Mjolsness
By Howard Pitcher
Attorney

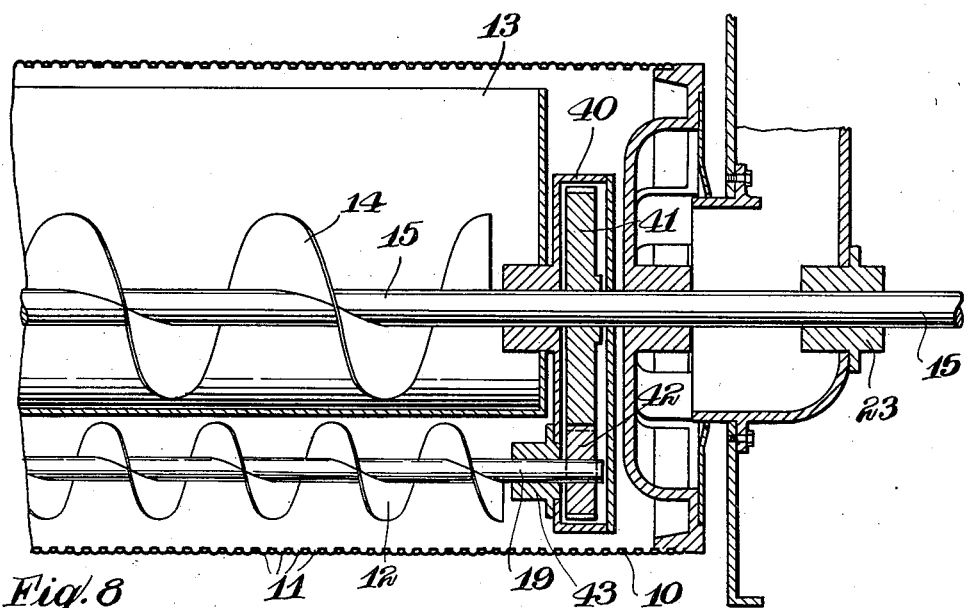
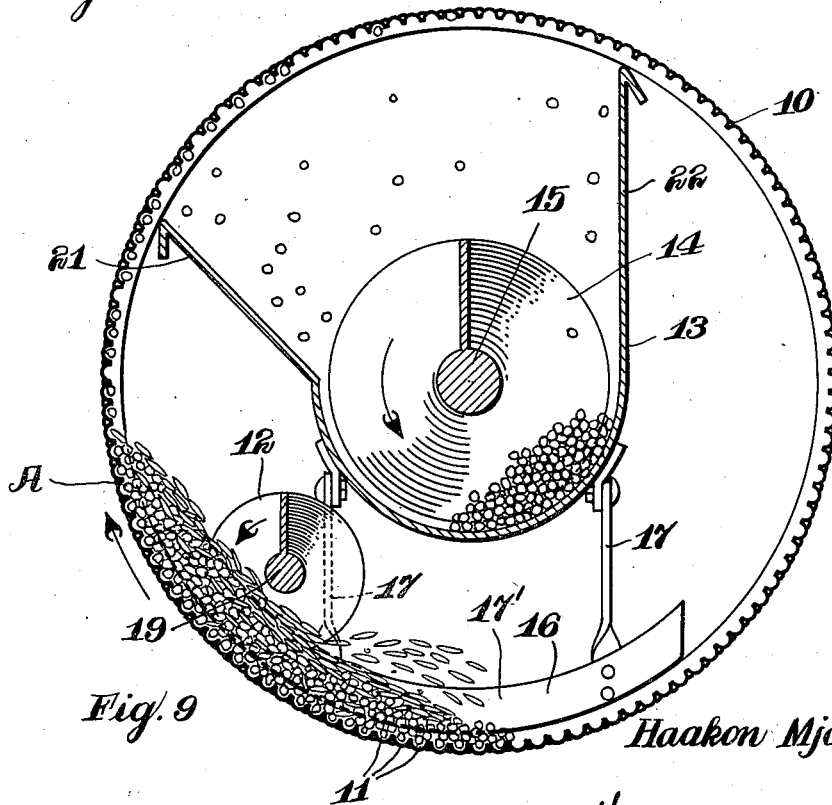

Dec. 5, 1939.   H. MJOLSNESS   2,182,638
APPARATUS FOR SEPARATING GRAIN
Filed Feb. 4, 1935   4 Sheets-Sheet 4

Inventor
Haakon Mjolsness
By
Attorney

Patented Dec. 5, 1939

2,182,638

UNITED STATES PATENT OFFICE 2,182,638

APPARATUS FOR SEPARATING GRAIN

Haakon Mjolsness, Minneapolis, Minn.

Application February 4, 1935, Serial No. 4,892

7 Claims. (Cl. 209—95)

My invention is directed to the type of grain separator in which an indented cylinder is driven, so as to hold the grain picked up by the indents of the cylinder in the same up to a certain point by centrifugal force, whereupon the grain is dropped into a trough supported in the cylinder. To permit the indented cylinder to be operated at the proper speed to accomplish the desired results in giving a most efficient separation, I provide a means of lowering the banked grain in the indented cylinder below the trough. This means may include screw feed means which rotates in the opposite direction to the rotation of the indented cylinder and travels at a much higher rate of speed.

The apparatus for carrying out my invention includes a novel type of retarder which is actuated automatically by the force of the grain and which is pivoted to swing out of the path of the grain as it is carried along the indented cylinder. This type of retarder obviates the type of retarder in which a bank of grain must be built up sufficient to flow over the retarder to drop through openings in the indented cylinder, or to pass through a spoked wheel or spider at the end of the cylinder. The spattering of the grain caused by the kernels dropping into the spokes or the opening edges is thus eliminated.

These features are some of the outstanding characteristics of my method and apparatus for separating grain.

To assist in describing my method I have shown certain diagrammatic illustrations to show the apparatus which may be employed in carrying out the method.

Figure 8 is a diagrammatic sectional view taken on the line 8—8 of Figure 7 in the direction of the arrows, showing the driving means for the conveyor.

Figure 9 is an enlarged diagrammatic sectional detail illustrating the separating process.

Figure 1:
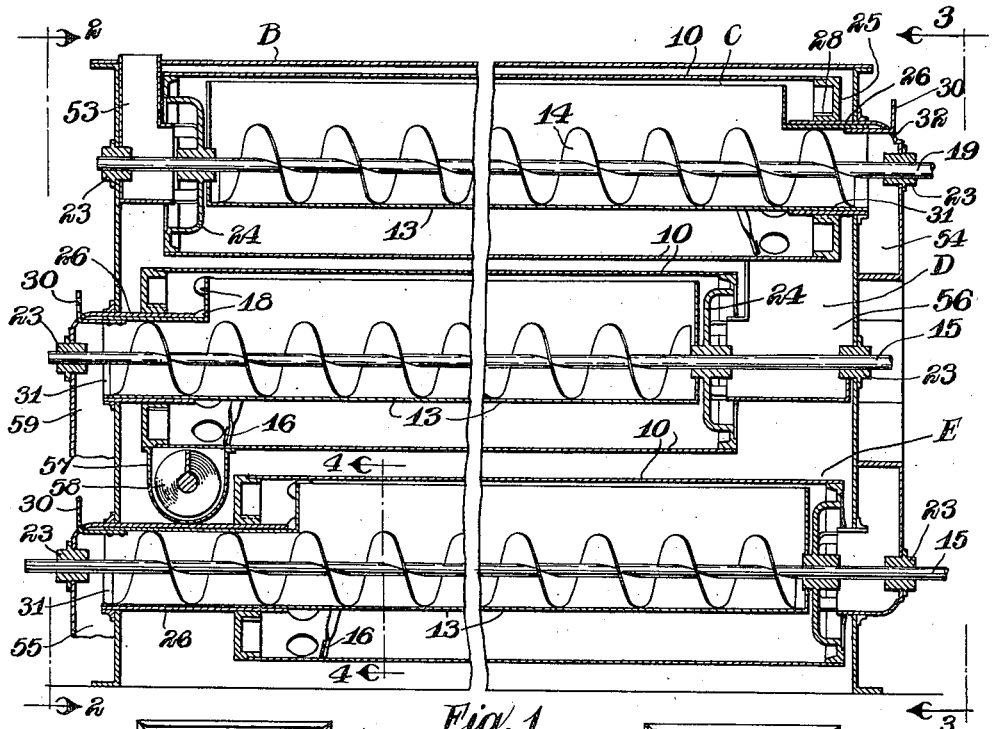
Figure 1 is a diagrammatic vertical section of a form of separator used in carrying out my method.

The apparatus for carrying out my high speed separation will be described in order that the method may be better understood. The grain is introduced into a rotatable cylinder 10 the surface of which is formed with indents 11. Small grain is carried by these pockets to a point above the larger grains, permitting the separation to take place. This type of cylinder has been used previously, and the action is well known in the art.

Offset to one side of the vertical axis of the cylinder 10, and near the inner surface thereof, is a rotatable conveyor 12. This conveyor is so positioned as to normally be near the center of the bank of grain within the cylinder as the cylinder 10 rotates. A trough 13 is positioned within the cylinder 10, mounted co-axial with the cylinder. A conveyor 14 within the trough 13 is mounted on a shaft 15 which also supports and rotates the cylinder 10 as will be described.

An adjustable retarder 16 is mounted to the trough 13. This retarder 16 comprises a pair of arms 17 pivoted to brackets on the trough near the discharge end of the cylinder 10, supporting an arcuated bearing member 17' against which grain may bear to pivot the arms 17. Openings 18 in the cylinder 10 permit grain passing beneath the raised retarder 16 to be discharged from the cylinder 10.

The conveyor 12 is mounted on a shaft 19 which may be supported to the trough by means of brackets 20 secured to the trough. The brackets 20 are positioned on the side of the trough 13 bearing the longitudinal guard shelf 21 of the trough.

Figure 2:
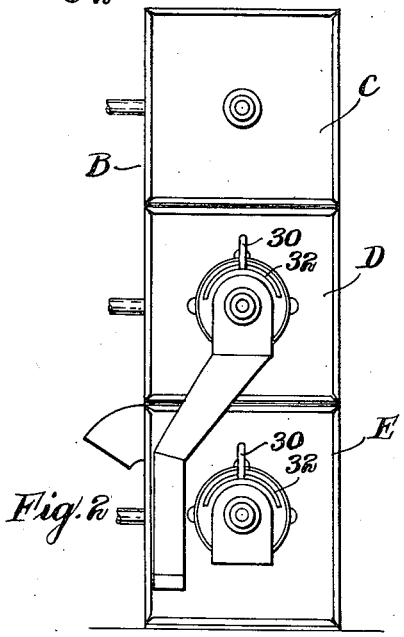
Figure 2 illustrates the end of the separator illustrated in Figure 1, on the line 2—2 of Figure 1.
Figure 3:
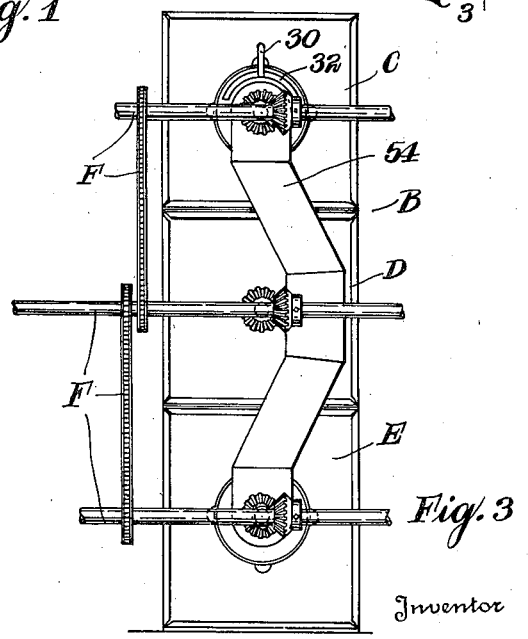
Figure 3 is an end view of the separator on the line 3—3 of Figure 1.

I have shown my grain separating apparatus as a unitary separator B made up of superimposed units C, D and E. Each unit includes a cylinder 10, and the relationship of these cylinders may be seen in Figures 1, 2 and 3. Each cylinder is actuated by a central shaft 15 which shafts are connected together to operate the cylinders 10 in unison by some suitable drive means such as is illustrated in Figure 3 of the drawings, and indicated as F. The ends of the shafts 15 are journalled in bearings 23 supported by the frame of the separator B, which may be of any suitable design to enclose the cylinders 10.

The cylinder 10 is supported at one end by a spider wheel 24 through which entering grain may pass into the cylinder 10. This spider 24 is keyed to the shaft 15, and acts to rotate the cylinder. The other end of the cylinder 10 is supported by a disc wheel or ring 25 having a bearing hub of relatively large diameter which rotates about a sleeve 26, supported by the frame of the separator B. This hub 27 of the ring 25 is provided with a ring gear 28 on its outer surface adapted to engage with a pinion on the shaft 19 to rotate the conveyor 12.

The trough 13 is rotatably adjustable in order to properly position the longitudinal guard shelf to catch small or heavy grain, but to permit the larger or lighter grains to fall back into the lower portion of the cylinder 10. The trough 13 merely rests for support upon the hub of the spider 24 at the inlet end of the cylinder 10. At the other end 31 of the trough 13, the trough is formed into cylindrical shape and extends into the sleeve 26. An adjusting handle 30 is connected to the trough 13 at this cylindrical end 31, and extends through an arcuated slot 32 in the frame adjacent the outer end of the sleeve 26. The trough 13 may be rotatably adjusted about the shaft 15 by this handle 30.

Figure 7:
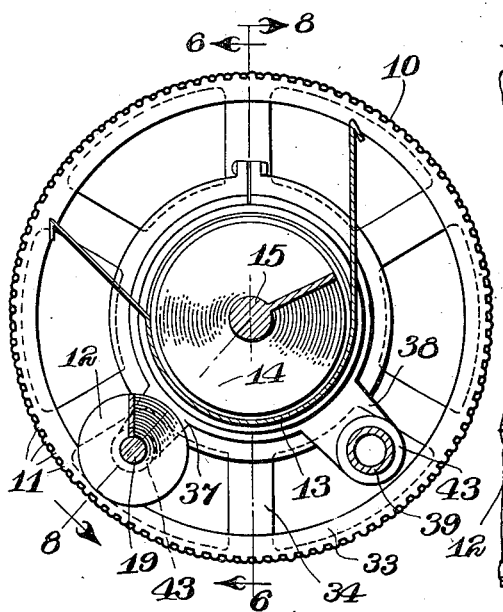
Figure 7 is a section on the line 7—7 of Figure 6.

As the conveyor 12 and the retarder 16 are both supported to the trough 13 in the form described, it is obvious that adjustment of the trough rotatably about the shaft 15 acts to also rotatably adjust the position of the conveyor 12 and the retarder 16. As in some installations this adjustment of the conveyor 12 and the retarder 16 may be undesirable, I disclose in Figures 6, 7 and 8 a slightly different form of construction in which the conveyor 12 is not adjusted with the trough 13. In this construction, a ring shaped retarder 33 is provided which acts to build up a bank of grain behind the same, so that the grain leaving the cylinder must drop over this ring and pass through the spoked wheel 34 supporting the discharge end of the cylinder 10.

Figure 6:
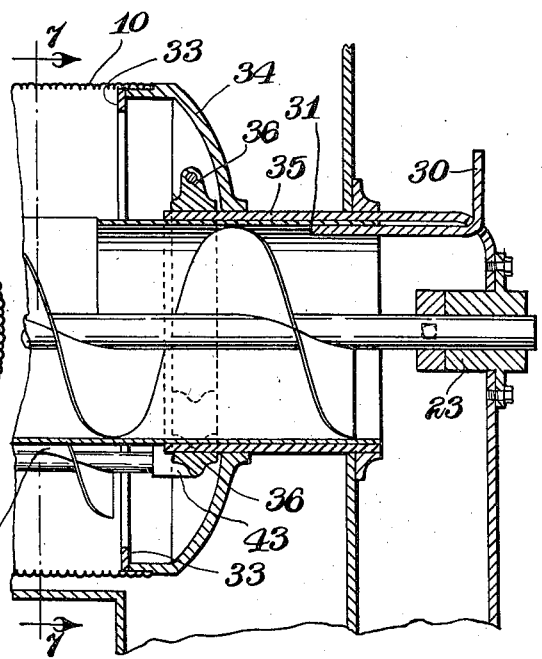
Figure 6 is a sectional detail similar to the section of Figure 5, excepting being of a different form of construction and is taken on the line 6—6 of Figure 7.

As shown in Figure 6, the sleeve 35 upon which the spoked wheel 34 is journalled is similar to the sleeve 26 but extends a greater distance into the cylinder 10. A split ring 36 is clamped over this inwardly extending end of the sleeve 35, and supports bearings for the shaft 19 of the conveyor 12 and for a reinforcing tube or pipe 39 which extends parallel to the conveyor 12 longitudinally of the cylinder 10, as disclosed in Figure 7. Integral brackets 37 and 38 on the ring 36 support the bearings for the conveyor 12 and the pipe 39.

The inlet end of the cylinder 10 of this modified type is shown in Figure 8. As shown in this figure, a bearing housing 40 is supported freely rotatable on the shaft 15, and contains gears 41 and 42. The gear 41 is mounted on, and rotates with, the shaft 15, while the gear 42 is mounted on the shaft 19 of the conveyor 12. The shaft 19 of the conveyor 12 and the pipe 39 extend through bearings 43 on the housing 40, thus preventing any rotation of these members about the shaft 15.

Figure 4:
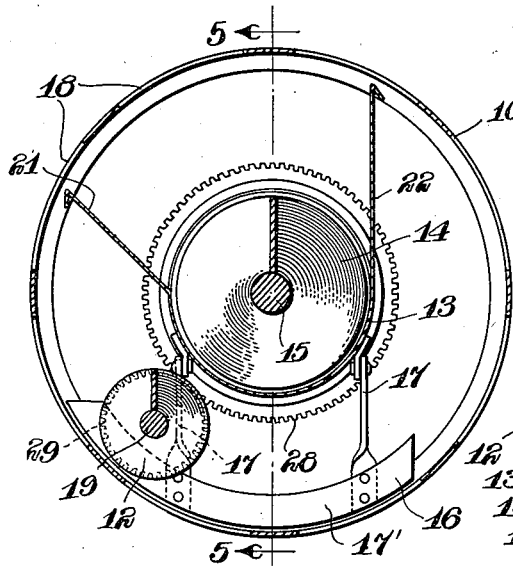
Figure 4 is a section on the line 4—4 of Figure 1, in the direction of the arrows.
Figure 5:
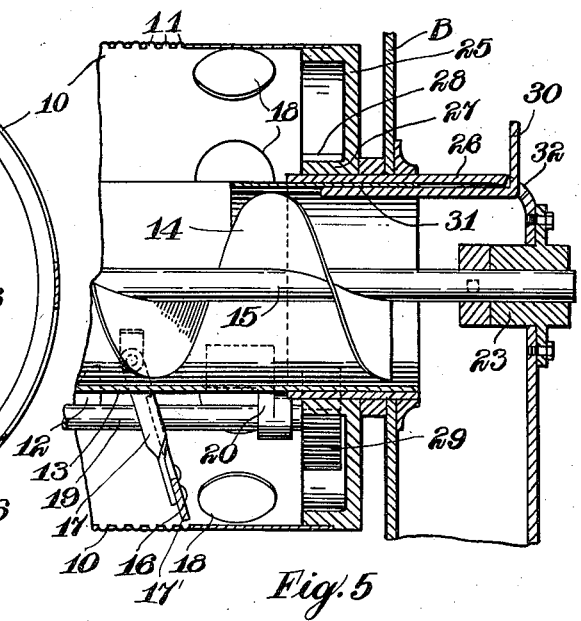
Figure 5 is a section on the line 5—5 of Figure 4.
Figure 10:
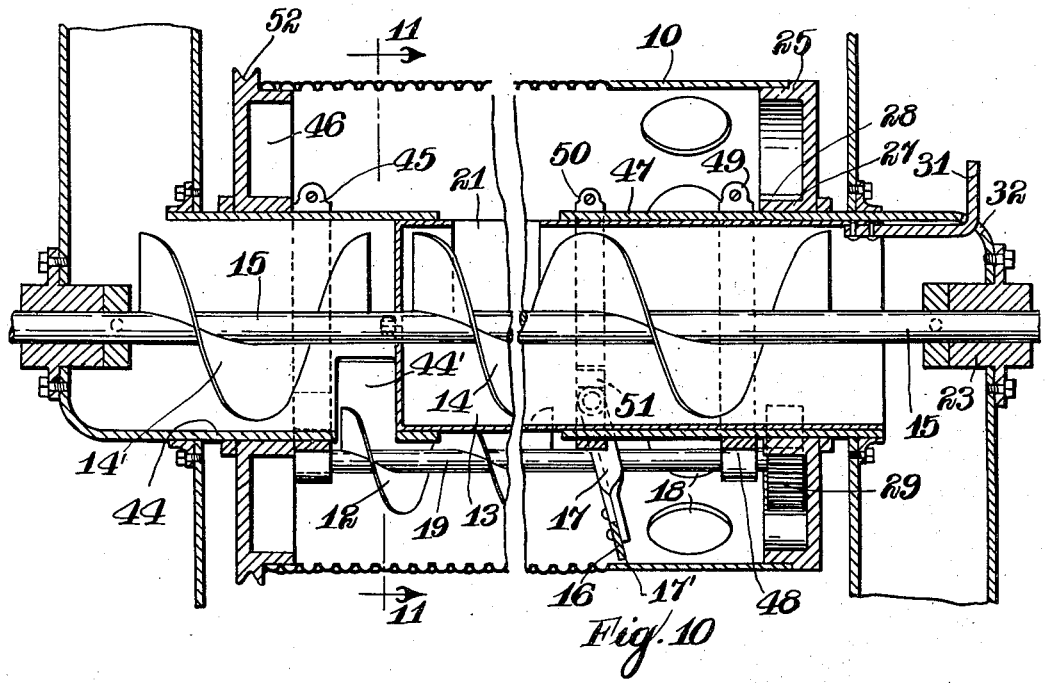
Figure 10 is a vertical sectional view longitudinally through a modified form of cylinder construction.
Figure 11:
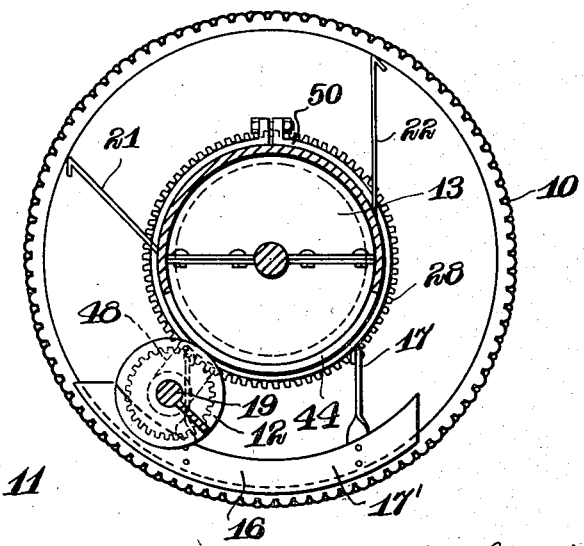
Figure 11 is a cross-section on the line 11—11 of Figure 10.

In Figures 10 and 11, I disclose still another form of construction in which the conveyor 12 is mounted in fixed relationship to the frame of the separator B. In the inlet end of this separating cylinder construction, a sleeve 44 extends into the cylinder 10 from the frame of the separator B. A split ring 45 encircles the inner end of this sleeve, forming a support for the inlet end of the conveyor shaft 19 of the conveyor 12. A disc wheel or ring 46, journalled on this sleeve 44, supports the inlet end of the cylinder 10. The sleeve 47 at the discharge end of this cylinder is similar to the sleeve 26, but extends to a greater length into the cylinder. Similarly to the construction shown in Figures 4 and 5 of the drawings, the discharge end of the cylinder 10 is supported by means of a disc wheel or rim 25 having an enlarged hub 27 embodying a ring gear 28, engageable with a pinion 29 on the shaft 19 of the conveyor 12. The discharge end of the shaft 19 is supported by a bracket 48 on a split ring 49 encircling the inwardly extending end of the sleeve 47. A second split ring 50 encircling the inwardly projecting end of the sleeve 47 acts as a support for a pair of brackets 51 to which the arms 17 of the retarder 16 are pivoted. As may be seen in Figure 10, the cylinder 10 of this type must be driven by external means, such as a belt in the groove 52 at one end of the cylinder externally of the same.

In the construction illustrated in Figures 10 and 11, the trough 13 is rotatably supported at either end by the inwardly extending sleeves 44 and 47. The sleeve 44 at the inlet end of the cylinder 10 is provided with an opening 44' through which the grain may pass from the inlet sleeve 44 to the bottom of the cylinder 10. A conveyor 14' on the end of the shaft 15 within the inlet sleeve 44 may be provided if desired to convey grain to the opening 44'. In this modification, the trough 13 is split as shown in Figures 10 and 11 in order that the trough may fit closely about the shaft 15 between the conveyors 14 and 14'.

In the operation of the separator B, the grain enters through the inlet chute 53, and passes through the spokes of the spider 24 to the inside of the cylinder 10. The smaller grains are raised by the pockets 11 and deposited into the trough 13 in the upper cylinder 10. The grain from the upper trough 13 is conveyed into the chute 54 to the lowermost cylinder 10 of the unit E. Here a similar action takes place, the grain dropping through the spokes of a spider 24 into the cylinder 10, wherein certain of the grains are deposited into the trough 13, and other grains remain in the cylinder 10, passing beneath the retarder 16 and out of the openings 18. The grain in the lowermost trough 13 is conveyed by the conveyor 14 into a chute 55. The grain remaining in the uppermost cylinder 10 after the separation passes through the openings 18 in the upper cylinder after raising the retarder 16, and drops down into the inlet chute 56 of the central cylinder. From the chute 56, the grain passes through the spider 24 of this cylinder, is separated, and is expelled, one grain dropping through the openings 18 into the trough 57 where it is conveyed to one side by the conveyor 58, and the other grain being conveyed from the trough 13 in this cylinder and into the chute 59.

The cylinders are designed so that when the cylinder 10 is seventeen inches in diameter and travels at 60 R. P. M., the conveyor 12 travels at about 180 R. P. M. While the applicant does not desire to limit himself to those speeds, they have been stated to illustrate that the applicant's separating cylinders 10 travel at a much higher speed than has been previously practical. Thus for the first time, centrifugal force plays an important part in the operation of an indented cylinder. If no means were provided for lowering the bank of grain along one wall of the rotating cylinder 10, the bank would extend so high that separation would be impossible. The extreme speed of the conveyor 12 holds the bank of grain to the approximate level previously attained without the conveyor 12 when the cylinder 10 travels at a slow speed. By the use of the conveyor 12, the applicant's high speed separation of grains is possible, and centrifugal force is put into use. The rotation of the conveyor 12, acts to skim the lighter grains from the top of the heavier grains which naturally move to the bottom of the grain bank. This skimming action further tends to position the lighter grains on top of the heavier grains, as every agitation of the grain tends to move the heavier grains to the bottom.

I have described the principles and operation of my apparatus for the separation of grain, and while I have endeavored to set forth the best embodiment thereof, I desire to have it understood that this is only illustrative of my invention, and a means for carrying out the same, and that obvious changes may be made within the scope of the following claims without departing from the spirit of my invention.

I claim:

1. The combination of, an indented cylinder rotatable, a separating trough extending longitudinally in said cylinder, a conveyor in said trough, a shaft for rotating said indented cylinder and said conveyor, means for adjusting said trough, a conveyor positioned in said cylinder below said trough, an automatically adjustable retarder at the discharge end of said last conveyor, pivoted mounting means for said retarder supporting the same longitudinally swingable within said cylinder, and means for rotating said indented cylinder and said first conveyor together while simultaneously rotating said second conveyor at a higher speed and in the opposite direction to the rotation of said indented cylinder to cause the rapid separation of grain banked longitudinally in said indented cylinder in the path of operation of said second conveyor and banked endwise by said automatically adjustable retarder.

2. A grain separating device including, an indented rotatable cylinder, means for supporting said cylinder, means for introducing grain into one end of said cylinder for the purpose of separating the same, a separating trough and conveyor positioned in said cylinder, a spreading and separating conveyor positioned in said cylinder, an automatically adjustable retarding means at the discharge end of said spreading conveyor adjusted automatically by the flow of grain against the same, and means for rotating said indented cylinder in one direction and simultaneously rotating said spreading conveyor in the opposite direction in a manner to set up a counter-rotating frictional force in the grain stream in said cylinder which causes said cylinder to elevate by receiving and holding some of the kernels of grain to carry them up to a separating position by centrifugal force, while the other grain is separated by carrying it toward said retarder and out of said cylinder by the rapid operation of said spreading conveyor.

3. A separator for grains including, a rotatable cylinder, a trough within said cylinder for containing separated grains, means for forcing grain within said cylinder toward the discharge end thereof, and a retarder secured to said trough including a pair of hinged arms, pivoted to swing longitudinally of said cylinder, and an arcuated bearing plate on said arms in the path of grain forced toward the discharge end of the cylinder engaged by grain forced toward the discharge end of the cylinder to swing the retarder to permit the passage of grain therebeneath.

4. A grain separator including, an indented cylinder, means for rotating said cylinder, a conveyor within said cylinder for conveying grain in the cylinder toward one end thereof, means for operating said conveyor, a longitudinally swingable retarder against which grain is forced by said conveyor, and a discharge opening adjacent the retarder through which grain passing said retarder may be discharged.

5. A grain separator including, an indented cylinder, a separating trough within said cylinder, means for rotating said cylinder to provide a bank of grain along one side thereof, a conveyor in said cylinder adapted to extend into said bank of grain, means for operating said conveyor to force grain from said bank toward one end of said cylinder, a longitudinally swingable retarder adjacent the end of said conveyor against which the grain from said bank is forced, said one end of the cylinder forming a discharge end through which grain passing said retarder may be automatically retarded before being discharged.

6. A separator for grains including, a rotatable cylinder, a trough in said cylinder for receiving grain picked up by said cylinder, means for spreading out the grain longitudinally in said cylinder and forcing the grain toward the discharge end thereof, and a retarder means peripherally engageable with said cylinder swingably positioned in said cylinder by action of the grain within said cylinder in a manner to provide a means of retarding the grain at the discharge end of said cylinder which is automatically adjustable in accordance with the flow of grain out of said cylinder.

7. The combination of, a grain separator cylinder means, means for feeding grain into said cylinder separating means, a grain spreading and conveying means in said cylinder means, and an automatically adjustable retarder operated by the grain within said cylinder associated with the discharge end of said conveyor adapted to automatically maintain a predetermined grain bank along said conveyor, said conveyor moving to permit the surplus grain to be discharged past said retarder and out of the separator cylinder means.

HAAKON MJOLSNESS.